(12) United States Patent
Nistor et al.

(10) Patent No.: US 10,425,320 B2
(45) Date of Patent: Sep. 24, 2019

(54) METHODS, SYSTEMS, AND COMPUTER READABLE MEDIA FOR NETWORK DIAGNOSTICS

(71) Applicant: Ixia, Calabasas, CA (US)

(72) Inventors: Marius Pavel Nistor, Bucharest (RO); Silviu Ionut Niculescu, Bucharest (RO); Alexandru-Bogdam Stefan, Bucharest (RO)

(73) Assignee: KEYSIGHT TECHNOLOGIES SINGAPORE (SALES) PTE. LTD., Singapore (SG)

( * ) Notice: Subject to any disclaimer, the term of this patent is extended or adjusted under 35 U.S.C. 154(b) by 261 days.

(21) Appl. No.: 14/984,459

(22) Filed: Dec. 30, 2015

(65) Prior Publication Data
US 2017/0180233 A1 Jun. 22, 2017

(30) Foreign Application Priority Data
Dec. 22, 2015 (RO) .............................. a 2015 01028

(51) Int. Cl.
*H04L 12/26* (2006.01)
*H04L 12/24* (2006.01)
(Continued)

(52) U.S. Cl.
CPC ............. *H04L 43/50* (2013.01); *H04L 41/12* (2013.01); *H04L 43/12* (2013.01); *H04L 67/02* (2013.01);
(Continued)

(58) Field of Classification Search
CPC ..... H04L 43/50; H04L 67/1042; H04L 43/06; H04L 43/103; G06F 11/3672
See application file for complete search history.

(56) References Cited

U.S. PATENT DOCUMENTS

| 6,073,085 A | 6/2000 | Wiley et al. |
| 6,549,882 B1 * | 4/2003 | Chen ..................... H04L 41/145 703/13 |

(Continued)

FOREIGN PATENT DOCUMENTS

| KR | 10-1401990 B1 | 6/2014 |
| WO | WO 2016/077084 A1 | 5/2016 |

OTHER PUBLICATIONS

Commonly-assigned, co-pending U.S. Appl. No. 16/251,365 for "Methods, Systems and Computer Readable Media for Proactive Network Testing," (Unpublished, filed Jan. 18, 2019).

(Continued)

*Primary Examiner* — Edward Kim

(57) ABSTRACT

Methods, systems, and computer readable media for network diagnostics are disclosed. According to one method, the method occurs at a diagnostics controller implemented using at least one processor. The method includes configuring a plurality of diagnostics nodes to observe traffic behavior associated with a system under test (SUT). The method also includes observing, using the diagnostics nodes, traffic behavior associated with the SUT. The method further includes detecting, using the traffic behavior, a SUT issue. The method also includes identifying, using SUT topology information, a network node in the SUT associated with the SUT issue. The method further includes triggering one of the diagnostics nodes to obtain node related information from the network node, wherein the diagnostics node uses at least one communications protocol to poll the network node for the node related information. The method also includes diagnosing, using the node related information, the SUT issue.

18 Claims, 6 Drawing Sheets

(51) Int. Cl.
*H04L 29/08* (2006.01)
*G06F 11/36* (2006.01)

(52) U.S. Cl.
CPC .......... *H04L 67/22* (2013.01); *G06F 11/3672* (2013.01); *H04L 41/0213* (2013.01); *H04L 41/0803* (2013.01); *H04L 43/08* (2013.01); *H04L 43/10* (2013.01); *H04L 67/1042* (2013.01)

(56) References Cited

U.S. PATENT DOCUMENTS

| | | | |
|---|---|---|---|
| 6,625,648 | B1 | 9/2003 | Schwaller et al. |
| 6,625,750 | B1 | 9/2003 | Duso et al. |
| 6,651,093 | B1* | 11/2003 | Wiedeman .......... H04L 12/4641 709/221 |
| 6,763,380 | B1 | 7/2004 | Mayton et al. |
| 7,278,061 | B2* | 10/2007 | Smith ................. H04L 29/06 370/242 |
| 7,730,029 | B2 | 6/2010 | Molotchko et al. |
| 9,356,855 | B2 | 5/2016 | Gintis |
| 9,641,419 | B2 | 5/2017 | Gintis |
| 10,205,938 | B2 | 2/2019 | Regev et al. |
| 2003/0149765 | A1* | 8/2003 | Hubbard ............ G06F 11/3672 709/224 |
| 2004/0003068 | A1* | 1/2004 | Boldman ............... H04L 43/50 709/223 |
| 2004/0066748 | A1 | 4/2004 | Burnett |
| 2004/0193709 | A1* | 9/2004 | Selvaggi ............ H04L 41/0213 709/224 |
| 2005/0050190 | A1* | 3/2005 | Dube ................ H04L 41/0846 709/223 |
| 2006/0146703 | A1 | 7/2006 | Cha et al. |
| 2007/0081467 | A1 | 4/2007 | Hurst et al. |
| 2008/0010523 | A1 | 1/2008 | Mukherjee |
| 2008/0056131 | A1 | 3/2008 | Balakrishnan et al. |
| 2008/0126561 | A1 | 5/2008 | Ryu et al. |
| 2009/0097409 | A1 | 4/2009 | Akhter et al. |
| 2010/0177644 | A1 | 7/2010 | Kucharczyk |
| 2011/0170433 | A1 | 7/2011 | Scobbie |
| 2012/0311132 | A1 | 12/2012 | Tychon et al. |
| 2014/0047112 | A1* | 2/2014 | Komiya ............... H04L 41/142 709/224 |
| 2014/0169189 | A1 | 6/2014 | Kalkunte |
| 2014/0229605 | A1* | 8/2014 | Besser ................. H04L 43/12 709/224 |
| 2014/0355613 | A1 | 12/2014 | Pope et al. |
| 2015/0106670 | A1 | 4/2015 | Gintis |
| 2015/0188788 | A1* | 7/2015 | Kolesnik ........... G06F 17/30569 709/224 |
| 2016/0080243 | A1 | 3/2016 | Kodama et al. |
| 2016/0087861 | A1* | 3/2016 | Kuan .................. H04L 43/065 709/224 |
| 2016/0134864 | A1 | 5/2016 | Regev et al. |
| 2016/0182310 | A1 | 6/2016 | Gintis |
| 2017/0171044 | A1 | 6/2017 | Das et al. |
| 2018/0062972 | A1 | 3/2018 | Rangappagowda et al. |

OTHER PUBLICATIONS

Notice of Allowance and Fee(s) Due and Applicant-Initiated Interview Summary for U.S. Appl. No. 14/537,851 (dated Sep. 17, 2018).
Communication of the extended European search report for European Application No. 15858789.9 (dated May 17, 2018).
Non-Final Office Action for U.S. Appl. No. 14/537,851 (dated Mar. 21, 2018).
Non-Final Office Action for U.S. Appl. No. 14/984,459 (dated Dec. 1, 2017).
Advisory Action for U.S. Appl. No. 14/537,851 (dated Sep. 20, 2017).
Communication of European publication No. and information on the application of Article 67(3) EPC for European Patent Application No. 15858789.9 (dated Aug. 23, 2017).
Final Office Action for U.S. Appl. No. 14/537,851 (dated May 19, 2017).
Notice of Allowance and Fee(s) Due for U.S. Appl. No. 14/581,931 (dated Dec. 19, 2016).
Non-Final Office Action for U.S. Appl. No. 14/537,851 (dated Oct. 6, 2016).
Advisory Action & AFCP 2.0 Decision for U.S. Appl. No. 14/537,851 (dated Sep. 15, 2016).
Final Office Action for U.S. Appl. No. 14/537,851 (dated Jun. 6, 2016).
Notification of Transmittal of the International Search Report and the Written Opinion of the International Searching Authority, or the Declaration for International Application No. PCT/US2015/058297 (dated Feb. 24, 2016).
Non-Final Office Action for U.S. Appl. No. 14/537,851 (dated Nov. 20, 2015).
"IxNetwork™ AVB Solution," Data Sheet, Document No. 915-1889-01 Rev A, www.ixiacom.com, pp. 1-18 (Oct. 2014).
"Hawkeye—Active Network Monitoring Platform," www.ixia.com, https://www.ixiacom.com/sites/default/files/2017-08/Ixia-V-DS-Hawkeye.pdf, pp. 1-7 (Aug. 2017).
"XR2000 Active Monitoring Hardware Endpoint for the Hawkeye™ and IxChariot® Product Lines," www.ixia.com, https://www.ixiacom.com/sites/default/files/resources/datasheet/xr2000.pdf, pp. 1-2 (Feb. 2016).
"IEEE Standard for Local and metropolitan area networks—Audio Video Bridging (AVB) Systems," IEEE Standards Association, IEEE Computer Society, IEEE Std 802.1BA™—2011, pp. 1-45 (Sep. 30, 2011).
"IEEE Standard for Layer 2 Transport Protocol for Time-Sensitive Applications in Bridged Local Area Networks," IEEE Standards Association, IEEE Computer Society, IEEE Std 1722™—2011, pp. 1-57 (May 6, 2011).
"IEEE Standard for Layer 3 Transport Protocol for Time-Sensitive Applications in Local Area Networks," IEEE Standards Association, IEEE Computer Society, IEEE Std 1733™—2011, pp. 1-21 (dated Apr. 25, 2011).
Kreibich et al., "Netalyzr: Illuminating Edge Network Neutrality, Security, and Performance," TR-10-006, International Computer Science Institute, pp. 1-17 (May 2010).
Teener, Michael Johas, "No-excuses Audio/Video Networking: the Technology Behind AVnu," AVnu™ Alliance White Paper, pp. 1-10 (Aug. 24, 2009).
Non-Final Office Action for U.S. Appl. No. 15/608,352 (dated March 20, 2019).
Communication pursuant to Article 94(3) EPC for European Patent Application Serial No. 15 858 789.9 (dated March 29, 2019).

* cited by examiner

METHODS, SYSTEMS, AND COMPUTER READABLE MEDIA FOR NETWORK DIAGNOSTICS

PRIORITY CLAIM

This application claims the benefit of Romanian Patent Application No. a 2015 01028, filed Dec. 22, 2015; the disclosure of which is incorporated herein by reference in its entirety.

TECHNICAL FIELD

The subject matter described herein relates to testing of computer networks. More specifically, the subject matter relates to methods, systems, and computer readable media for network diagnostics.

BACKGROUND

Network operators generally test network nodes prior to deploying them in live networks. For example, a mobile network operator may test a new generation of communications equipment using a test network and/or multiple testing platforms before deploying the communications equipment in a live (e.g., non-test) network. However, even with prior testing, sometimes live networks may experience various issues that need to be debugged or diagnosed and quickly resolved. Such issues can be expensive, time consuming, and resource intensive to diagnose and resolve. Moreover, theses issues can affect end user experience and/or cause network outages.

Accordingly, a need exists for improved methods, systems, and computer readable media for network diagnostics.

SUMMARY

Methods, systems, and computer readable media for network diagnostics are disclosed. According to one method, the method occurs at a diagnostics controller implemented using at least one processor. The method includes configuring a plurality of diagnostics nodes to observe traffic behavior associated with a system under test (SUT). The method also includes observing, using the diagnostics nodes, traffic behavior associated with the SUT. The method further includes detecting, using the traffic behavior, a SUT issue. The method also includes identifying, using SUT topology information, a network node in the SUT associated with the SUT issue. The method further includes triggering one of the diagnostics nodes to obtain node related information from the network node, wherein the diagnostics node uses at least one communications protocol to poll the network node for the node related information. The method also includes diagnosing, using the node related information, the SUT issue.

According to one system, the system includes a diagnostics controller implemented using at least one processor. The diagnostics controller is configured to configure a plurality of diagnostics nodes to observe traffic behavior associated with a SUT, to observe, using the diagnostics nodes, traffic behavior associated with the SUT, to detect, using the traffic behavior, a SUT issue, to identify, using SUT topology information, a network node in the SUT associated with the SUT issue, to trigger one of the diagnostics nodes to obtain node related information from the network node, wherein the diagnostics node uses at least one communications protocol to poll the network node for the node related information, and to diagnose, using the node related information, the SUT issue.

The subject matter described herein may be implemented in software in combination with hardware and/or firmware. For example, the subject matter described herein may be implemented in software executed by a processor. In one exemplary implementation, the subject matter described herein may be implemented using a non-transitory computer readable medium having stored therein computer executable instructions that when executed by the processor of a computer control the computer to perform steps. Exemplary computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computer platform or may be distributed across multiple devices or computer platforms.

As used herein, the term 'node' refers to a physical computer platform including at least one processor, network interface, and/or memory.

As used herein, each of the terms 'function', 'engine', and 'module' refers to hardware, which may also include software and/or firmware, for implementing the feature(s) being described.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for network diagnostics. Network diagnostics typically require a network operator to manually execute numerous tests and attempt to diagnose issues or problems based on test results and known configuration information. However, since such diagnostics are manually performed and because some issues are not readily apparent from typical test results, such network diagnostics typical requires significant guesswork and can be very time consuming, inefficient, and error-prone.

In accordance with some aspects of the subject matter described herein, techniques, methods, or mechanisms are disclosed for automating diagnosing network issues and preventing such issues by simulating of real traffic and using the results for debugging a system under test (SUT) (e.g., one or more network devices). For example, a diagnostics tool or a related algorithm may identify with precision a root cause of one or more issue by using a non-intrusive approach in monitoring a live network, such as using scripts to obtain status information and/or other device related information from network devices using one or more communications protocols supported by the network devices.

Advantageously, in accordance with some aspects of the subject matter described herein, debugging and/or troubleshooting of networks may be improved by using diagnostics nodes that execute one or more scripts for robustly and automatically obtaining status information and/or other device related information from one or more devices (e.g., network nodes and/or functions). By using scripts and/or one or more diagnostics algorithms, a large network containing significant numbers of devices can be diagnosed quickly with little to no human intervention, thereby reducing costs and network downtime.

Figure 1:
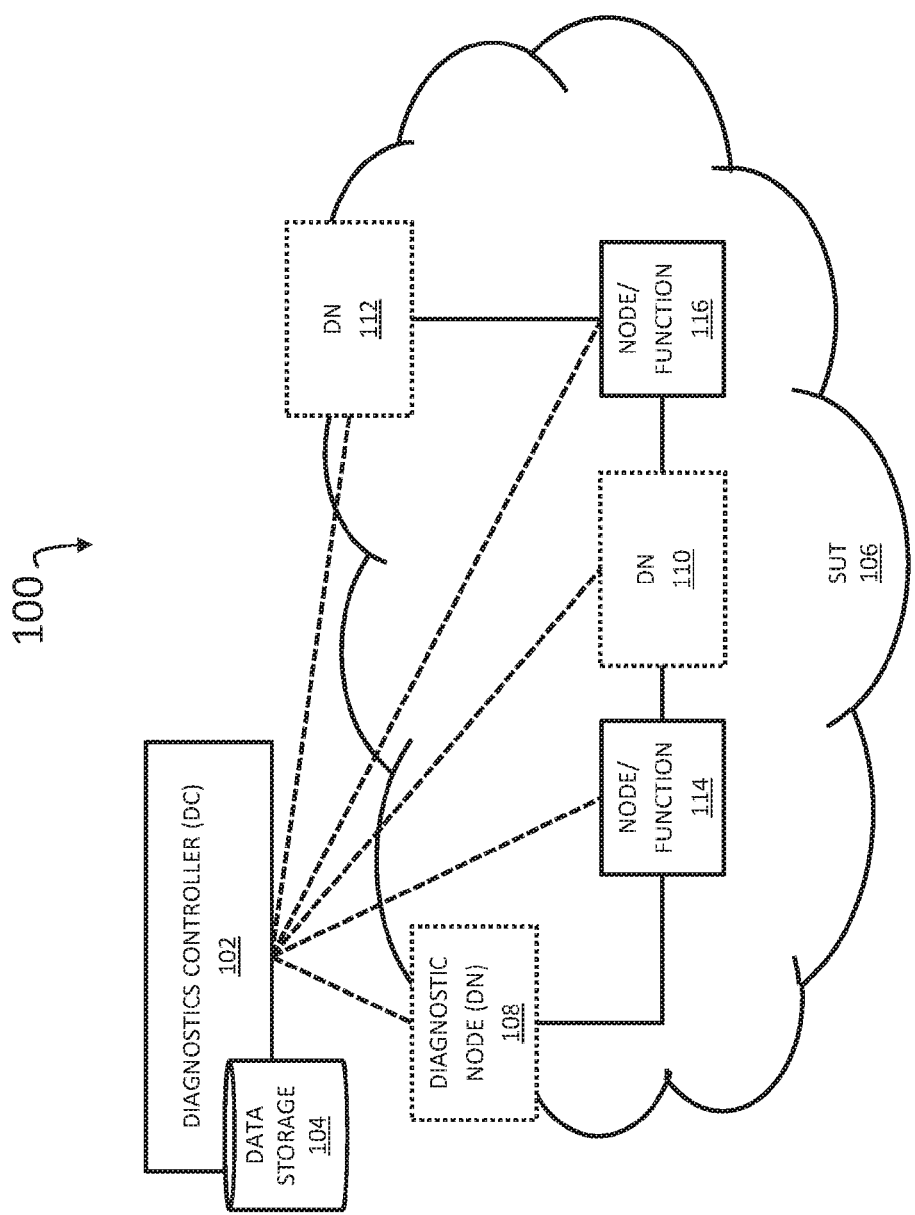
FIG. 1 is a diagram illustrating an environment for network diagnostics according to an embodiment of the subject matter described herein.

FIG. 1 is a diagram illustrating a computing environment 100 for network diagnostics according to an embodiment of the subject matter described herein. Referring to FIG. 1, computing environment 100 may include a diagnostics controller 102, data storage 104, diagnostics nodes (DNs) 108-112, and a system under test (SUT) 106 including network nodes and/or functions (nodes/functions) 114-116.

Diagnostics controller 102 may represent any suitable entity (e.g., one or more computing platforms or a testing tool implemented using at least one processor) for performing various aspects associated with diagnosing or troubleshooting issues associated with SUT 106. In some embodiments, diagnostics controller 102 may also perform testing of SUT 106 or be involved in testing SUT 106.

In some embodiments, diagnostics controller 102 may configure one or more DNs 108-112 to generate and send test traffic to SUT 106 and/or to observe network traffic, generate traffic related metrics, and perform diagnostics on one or more portions of SUT 106. For example, diagnostics controller 102 and/or DNs 108-112 may include functionality for using testing scripts for configuring one or more tests of SUT 106 and may also utilize diagnostics scripts (e.g., in a command line interface (CLI) related scripting language) for obtaining data from network nodes or functions in SUT 106. In this example, each diagnostics script may utilize different syntax, commands, and/or language based on a type of node being diagnosed and/or the communications protocol or interface used.

Data storage 104 may represent any suitable entity (e.g., a non-transitory computer readable medium, embedded memory, or a memory device) for storing data associated with testing and/or diagnostics. For example, data storage 104 may store various diagnostics scripts, testing scripts, SUT operating characteristics (e.g., configuration information, performance capability information, internal resource information, etc.), SUT connectivity information (e.g., link status information, port information, etc.), SUT related communications interface information (e.g., SUT network management communications interface protocol information, simple network management protocol (SNMP) information, simple shell (SSH) protocol information, Telnet information, hypertext transfer protocol (HTTP) information, representational state transfer (REST) protocol information, application program interface (API) information, proprietary API information, etc.). In some embodiments, data storage 104 may be accessible by diagnostics controller and/or other entities. In some embodiments, data storage 104 may be located on a single device or computing platform or may be distributed across multiple devices or computing platforms.

In some embodiments, diagnostics controller 102 may configure a SUT 106 and may then validate SUT 106 or a portion thereof, such as individual network elements or nodes/functions. In such embodiments, this configuration may, optionally, be performed using an SDN controller or a proprietary controller which has one or more application programming interface (APIs) exposed and is supported by diagnostics controller 102.

In some embodiments, diagnostics controller 102 may receive information about a pre-existing SUT configuration (e.g., from a network controller or a related database) and may configure DNs 108-112 for validating the SUT configuration. In some embodiments, diagnostics controller 102 may modify some aspects of a configuration for various test and measurement purposes. In such embodiments, diagnostics controller 102 may change the modified configuration back to its original configuration.

SUT 106 may include nodes/functions 114-116 and/or other entities for performing one or more functions or services. For example, SUT 106 may include nodes/functions 114-116 for converting VoIP packets from one format to another format, where each node/function in SUT 106 performs one or more functions associated with converting the VoIP packets. In another example, SUT 106 may include nodes/functions 114-116 for providing media communications between two networks. In this example, node/function 116 may perform a firewall function and node/function 114 may perform a media server function.

Each of nodes/functions 114-116 may represent any suitable entity (e.g., software stored in a memory and/or executing using at least one processor) for performing one or more network functions. Each of nodes/functions 114-116 may be a logical construct implemented using hardware or physical resources from one or more locations, devices, and/or platforms. For example, using at least one processor from a first computer platform or server rack and memory from a second computer platform or server rack, node/function 116 may perform web server functions, e.g., receiving hypertext transfer protocol (HTTP) requests and providing HTTP responses. In another example, using processors and memory from a same computer platform or server rack, node/function 114 and node/function 116 may perform encryption functions and decryption functions, respectively.

Each of DNs 108-112 may represent any suitable entity (e.g., software stored in a memory and/or executed using at least one processor) for performing various aspects associated with testing SUT 106 and/or diagnosing various potential communications or network issues associated with SUT 106. For example, DN 108 may act as an endpoint (e.g., a daemon or service executing on at least one processor) that receives test setup information diagnostics controller or a test controller and generates traffic according to the received test setup information.

In some embodiments, each of DNs 108-112 may be implemented using hardware or physical resources from one or more locations, devices, and/or platforms. For example, DN 110 may be implemented on a same computer platform as DN 112 and node/function 116. In another example, DN 110 may be implemented on different computer platforms from DN 112 and node/function 116.

In some embodiments, DNs 108-112 may test various nodes/functions, e.g., a load balancing node/function, an intrusion detection node/function, an intrusion protection node/function, an antivirus node/function, a firewall node/function, an antispam node/function, a switching node/function, or a routing node/function. In some embodiments, DNs 108-112 may act or appear to other entities like DNs, nodes, functions, networks, or hosts. In some embodiments, testing by DNs 108-112 may be transparent or unknown by other entities (e.g., nodes/functions 114-116) in SUT 106.

In some embodiments, DNs 108-112 may be configured to generate and/or send test traffic for testing SUT 106 or one or more of nodes/functions 114-116. In some embodiments, traffic generation information may be determined based on testing requirements, a node/function's functionality, and/or other factors. For example, DN 108 may be configured to act as a traffic generator for testing node/function 114 performing a firewall function. In this example, diagnostics controller 102 may configure DN 108 to generate traffic that appears to originate from different networks, including local and remote networks. Continuing with this example, DN 108 may send the generated traffic to node/function 114, where a subsequent DN 110 may analyze output from node/function 114.

In some embodiments, DNs 108-112 may be configured for validating end to end functionality of SUT 106. For example, DN 108 may be located at a start of SUT 106 and DN 112 may be located at an end of SUT 106. In this example, DN 108 may send test traffic via an egress port to node/function 114 and then, after processing, node/function 114 may send the traffic to node/function 116 via DN 110, before being sent from node/function 116 to DN 112. Continuing with this example, DN 112 may analyze the output for errors or other potential issues based on expected output for the test traffic.

In some embodiments, DNs 108-112 may be configured to act as a network tap for monitoring traffic and/or observing network behavior. For example, diagnostics controller 102 may configure DN 110 to act as a network tap in SUT 106 for analyzing traffic, copying traffic, generating traffic related metrics, and/or other tap related function.

In some embodiments, DNs 108-112 may be configured to perform diagnostics functions. For example, each of DNs 108-112 may be configured with a diagnostics engine or a diagnostics algorithm capable of diagnosing issues associated with SUT 106 by communicating with one or more nodes/functions 114-116 using one or more management or communications protocols, programs, or communications interfaces. In this example, the diagnostics algorithm may attempt to communicate using a plurality of communications protocols (e.g., a management protocol, SNMP, or HTTP) or mechanisms and may learn or adapt itself based on preconfigured settings, historical data, and/or user preferences.

In some embodiments, a diagnostics engine or a related algorithm may access and interpret diagnostics scripts capable of communicating and/or diagnosing issues associated with various different types of nodes/functions. For example, a diagnostics algorithm executing at DN 108 may access and utilize various diagnostics scripts for communicating (or attempting to communicate) with various nodes using various communications protocols. In this example, a first diagnostics script may be triggered by the diagnostics algorithm when attempting to communicate using an SNMP protocol, a second diagnostics script may be triggered by the diagnostics algorithm when attempting to communicate using an SSH protocol, and a second diagnostics script may be triggered by the diagnostics algorithm when attempting to communicate using an HTTP protocol, a Cmd protocol, or a Bash protocol.

In some embodiments, a diagnostics script may be device specific. For example, a first diagnostics script may be for communicating with and diagnosing issues associated with node/function 114 (e.g., a firewall function/node or a switch device) and a second diagnostics script may be for communicating with and diagnosing issues associated with node/function 116 (e.g., a web server). In this example, each diagnostics script may request different types of information depending on the functionality or capabilities of the node/function being diagnosed.

In some embodiments, DNs 108-112 may be configured for dynamic pluggability (e.g., insertion, activation, or de-activation). For example, DN 108 may represent a virtual image (e.g., a virtual client instance) which can be dynamically inserted around or in SUT 106 based on various factors, such as testing requirements, detected traffic issues, network conditions, or time of day.

In some embodiments, after DNs 108-112 are installed in computing environment 100, each of DN 108-112 may register with diagnostics controller 102 or a related system. In some embodiments, either automatically or based on user input, diagnostics controller 102 may create a topology of SUT 106 and may initiate testing of SUT 106 using different traffic scenarios at some interval of time. For example, each traffic scenario may involve varying types of traffic throughput performance, e.g., including voice, video, and mixes of application traffic.

In some embodiments, after a traffic simulation phase, diagnostics controller 102 may be capable of determining, with precision, which segment of network experiences network issues. For example, DC may receive traffic related metrics and/or other information from DNs 108-112 and may analyze this information to determine whether certain routes, nodes, functions, and/or types of traffic did not act as expected or predicted, e.g., based on known topology, historical information, test requirements or thresholds, etc.

In some embodiments, after detecting one or more issues, relevant information (e.g., test related information) may be sent to DNs (e.g., DN 108-112) which are at the edges or in a problematic route or network segment. Using information received from diagnostics controller 102 and/or other relevant information, each of the DNs may utilize a diagnostics engine or a diagnostics algorithm for performing diagnostics in attempt to identify the cause of detected issues and provide potential solutions. Additional details regarding an example diagnostics algorithm is discussed below in relation to FIGS. 2A and 2B.

It will be appreciated that FIG. 1 is for illustrative purposes and that various depicted entities, their locations, and/or their functions described above in relation to FIG. 1 may be changed, altered, added, or removed. For example, a device (e.g., a computer including at least one processor coupled to a memory) may include functionality of node/function 114 and DN 108.

Figure 2A:
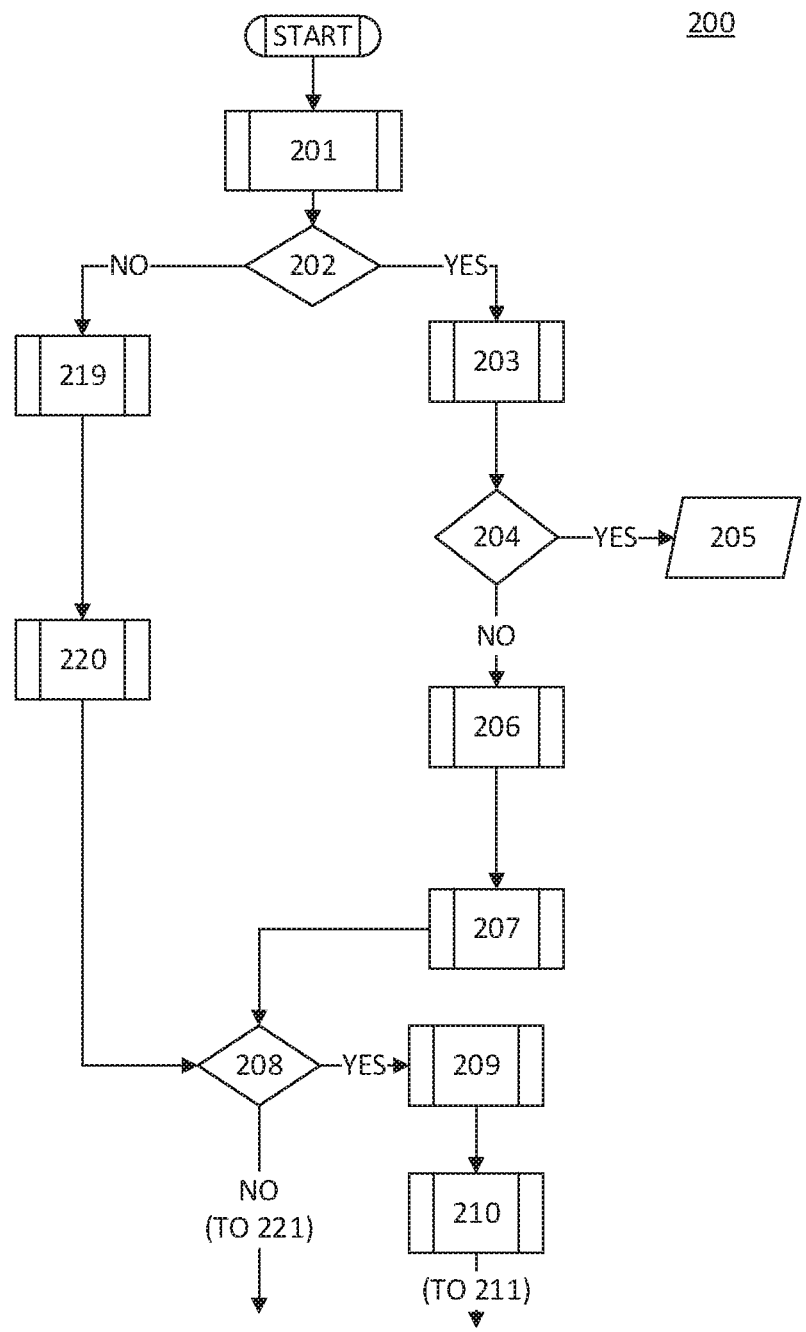
FIGS. 2A-2B are diagrams illustrating a diagnostics algorithm according to an embodiment of the subject matter described herein.
Figure 2B:
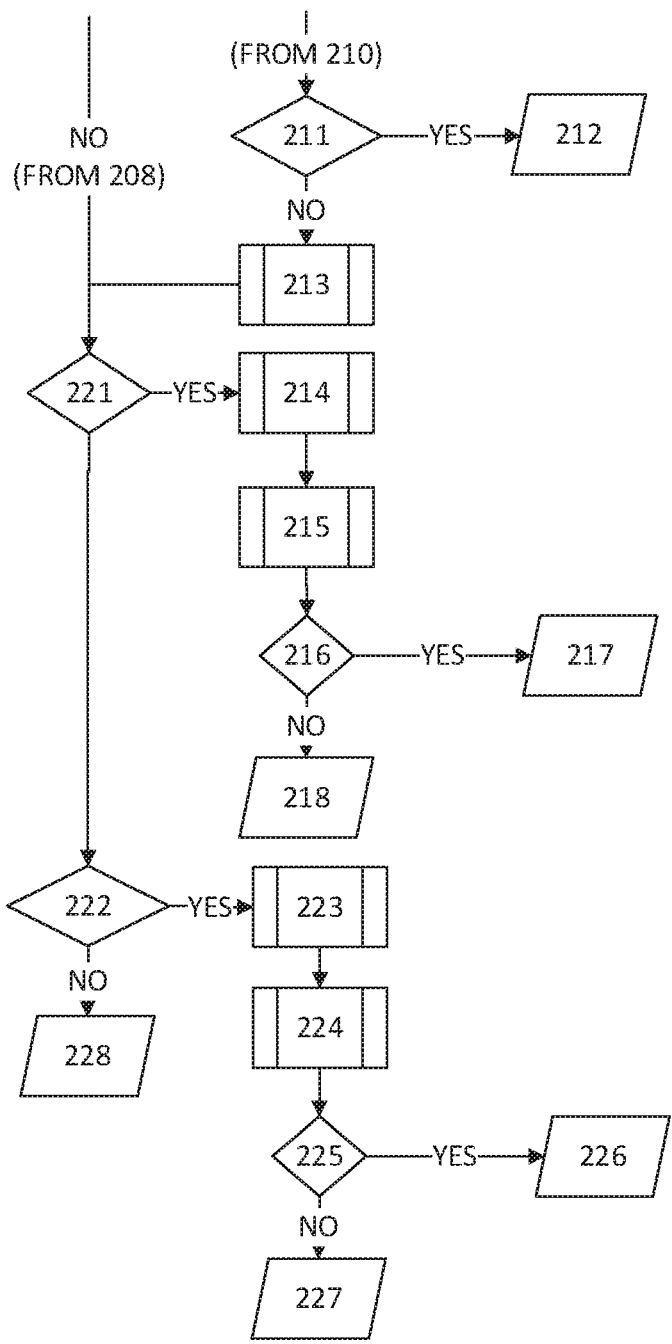

FIGS. 2A-2B represent a diagram illustrating a diagnostics algorithm according to an embodiment of the subject matter described herein. In some embodiments, a diagnostics algorithm, also referred to as a troubleshooting algorithm, may include logic for debugging issues associated with SUT 106 or nodes/functions therein. For example, a diagnostics algorithm may use one or more communications protocols and/or automated scripts for communicating with one or more nodes/functions (e.g., nodes/functions 114-116).

Referring to FIG. 2A, in step 201, input from testing (e.g., traffic related metrics, status information, and/or other information associated with SUT 106 may be used to infer, derive, or determine various inputs for performing SUT related diagnostics. For example, inputs may be based on test results and/or other information and may include Internet protocol (IP) address information, traffic protocols utilized (e.g., transmission control protocol (TCP) and/or user datagram protocol (UDP)), and information about potential issues (connectivity issues, throughput issues, network delay or jitter outside an acceptable threshold, connections interruptions, Wi-Fi bad signals, etc.).

In step 202, it may be determined whether a connectivity issue has likely occurred during testing. For example, when a measured throughput between the endpoints is smaller than a predicted value, additional steps may be performed for checking SUT's or a related device's connectivity.

In some embodiments, if a connectivity issue has likely occurred during testing, step 203 may occur. In some embodiments, if a connectivity issue has likely not occurred during testing, step 227 may occur.

In step 227, route availability may be checked and/or verified. For example, diagnostics algorithm 200 executing at DN 108 may initiate a "traceroute" command from the local endpoint and analyze the response.

In step 228, an issue causing device may be detected and reported. For example, diagnostics algorithm 200 executing at DN 108 may use a response to a "traceroute" command to detect a device that is causing network issues, such as a device acting as a traffic bottleneck.

In step 203, connectivity (or lack thereof) to a local device (e.g., node/function 114) may be checked and/or verified.

In step 204, it may be determined whether a connectivity issue involving the local device exists. For example, a ping command may be performed using an IP address associated with the local device. In this example, if the ping command is successful, it may be determined that no connectivity issues exist, but if the ping command fails, then it may be determined that a connectivity issue does exist.

In some embodiments, if a connectivity issue involving the local device exists, step 205 may occur. In some embodiments, if a connectivity issue involving the local device does not exist, step 206 may occur.

In step 205, a cause or diagnosis may be reported, e.g., to a user, a report system, or another entity.

In step 206, connectivity to a peer node (e.g., diagnostics controller 102, DN 108, DN 110, DN 112, etc.) may be checked and/or verified.

In step 207, if connectivity to a peer node cannot be verified, a blocking device (e.g., an intermediary device or firewall) may be detected and may be reported.

In step 208, it may be determined whether the local device is accessible using an SNMP protocol.

In step 209, if the local device is accessible using an SNMP protocol, an SNMP connection may be established.

In step 210, possible causes of one or more detected issues may be determined using the input from testing and/or other information.

Referring to FIG. 2B, in step 211, it may be determined whether device (e.g., node) related information obtained using an SNMP protocol is useful for diagnosing one or more detected issues. For example, test related information and detected issues may be analyzed to determine whether information obtainable using an SNMP protocol is likely to diagnose a detected issue.

In some embodiments, if device related information obtained using an SNMP protocol is determined to be relevant to one or more detected issues, step 212 may occur. In some embodiments, if device related information obtained using an SNMP protocol is determined to be not relevant to one or more detected issues, step 213 may occur In step 212, device related information may be obtained and a cause or diagnosis may be reported, e.g., to a user, a report system, or another entity. For example, diagnostics algorithm 200 executing at DN 108 may send an SNMP request message to node/function 114 for requesting configuration information, object identifier (01D) related information, and/or other information related to node/function 114 and an SNMP answer message containing requested information may be sent from node/function 114 to DN 108.

In step 213, device related information may be obtained. For example, diagnostics algorithm 200 executing at DN 108 may store device related information obtained using SNMP and may also attempt to retrieve additional information using other communications interfaces and/or communications protocols.

In step 214, it may be determined whether the local device is accessible using SSH. In some embodiments, if device related information obtained using SSH is determined to be relevant to one or more detected issues, step 215 may occur. In some embodiments, if device related information obtained using SSH is determined to be not relevant to one or more detected issues, step 220 may occur.

In step 215, an SSH session may be established.

In step 216, one or more device specific scripts may be executed during the SSH session. For example, diagnostics algorithm 200 executing at DN 108 may execute a script that utilizes SSH or a related program or interface for obtaining device related information and/or device based metrics.

In step 217, it may be determined whether device related information obtained using SSH is relevant to one or more detected issues. For example, device related information may indicate configuration problems, hardware issues, and/or other issues that may affect throughput of SUT 106.

In some embodiments, if device related information obtained using SSH is determined to be relevant to one or more detected issues, step 218 may occur. In some embodiments, if device related information obtained using SSH is determined to be not relevant to one or more detected issues, step 219 may occur.

In step 218, a cause or diagnosis may be reported, e.g., to a user, a report system, or another entity.

In step 219, an error or a related message indicating that a cause for a detect issue is not found may be reported. In some embodiments, prior to reporting an error, additional diagnostics steps may be performed including obtaining information from a local device using additional communications interfaces and/or communications protocols.

In step 220, it may be determined whether the local device is accessible using an HTTP API. In some embodiments, if a local device is accessible using an HTTP API, step 221 may occur. In some embodiments, if a local device is not accessible using an HTTP API, step 226 may occur.

In step 221, an HTTP connection may be established.

In step 222, one or more device specific scripts may be executed during the HTTP connection. For example, diagnostics algorithm 200 executing at DN 108 may execute a script that utilizes an HTTP API or a related program or interface for obtaining device related information and/or device based metrics.

In step 223, it may be determined whether device related information obtained using an HTTP API is relevant to one or more detected issues. For example, device related information may indicate configuration problems, hardware issues, and/or other issues that may affect throughput or jitter of SUT 106.

In some embodiments, if device related information obtained using an HTTP API is determined to be relevant to one or more detected issues, step 224 may occur. In some embodiments, if device related information obtained using an HTTP API is determined to be not relevant to one or more detected issues, step 225 may occur.

In step 224, a cause or diagnosis may be reported, e.g., to a user, a report system, or another entity.

In step 225, an error or a related message indicating that a cause for a detect issue is not found may be reported. In some embodiments, prior to reporting an error, additional diagnostics steps may be performed including obtaining information from a local device using additional communications interfaces and/or communications protocols.

It will be appreciated that FIGS. 2A and 2B are for illustrative purposes and that different and/or additional actions than those depicted in FIGS. 2A and 2B may be used for SUT related diagnostics. It will also be appreciated that various actions described herein may occur concurrently or in a different order or sequence. For example, diagnostics algorithm 200 may include self learning aspects that may avoid using certain communications protocols, interfaces, or programs based on historical success rates and/or based on results involving similar types of devices being diagnosed. In another example, diagnostics algorithm 200 may change an order that communications mechanisms are utilized for different devices being diagnosed.

Figure 3:
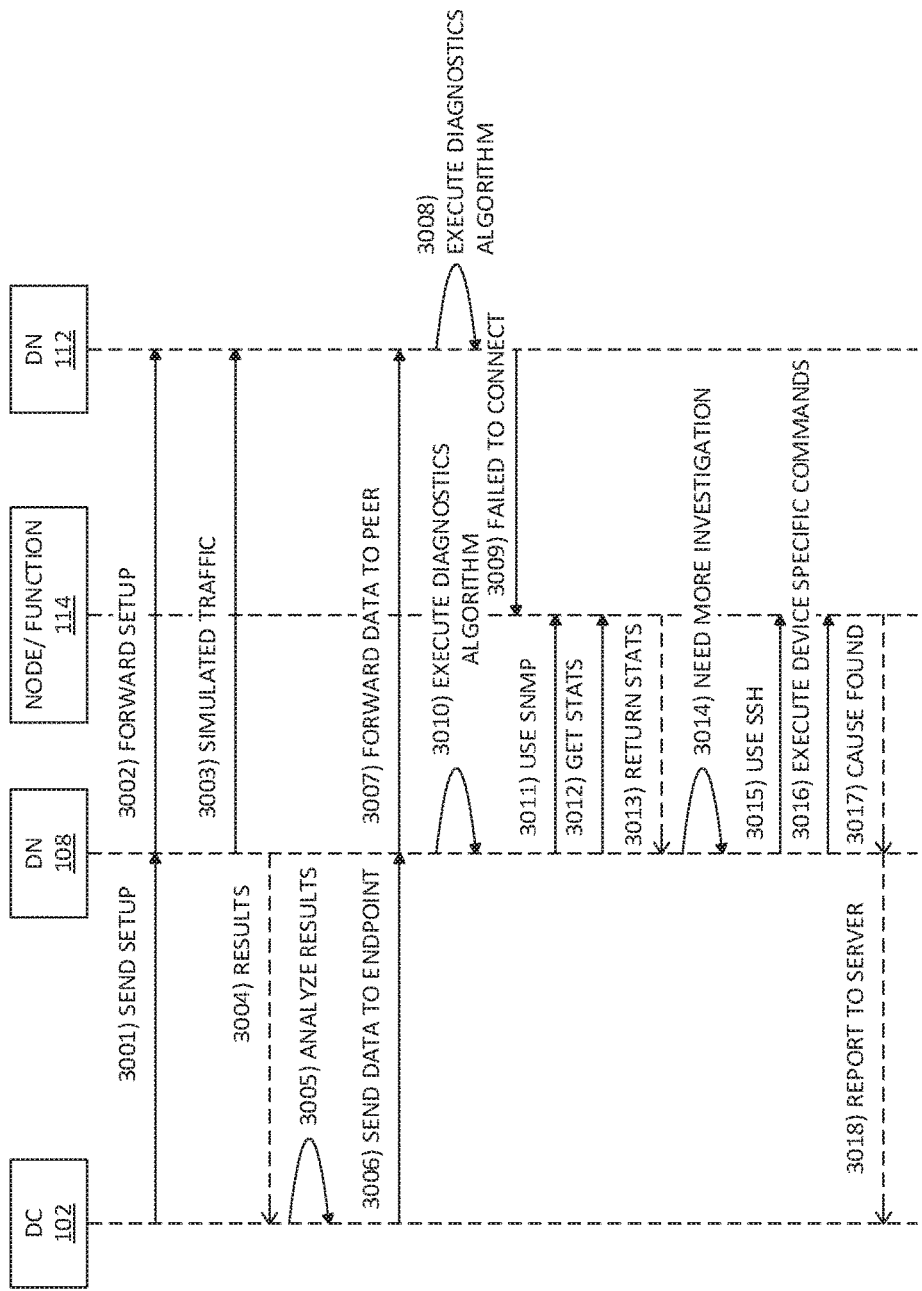
FIG. 3 is a diagram illustrating communications associated with network diagnostics according to an embodiment of the subject matter described herein.

FIG. 3 is a diagram illustrating communications associated with network diagnostics according to an embodiment of the subject matter described herein. In some embodiments, diagnostics controller 102 may interact with computing environment 100 for configuring, provisioning, or managing DNs 108-112 and/or testing SUT 106. For example, diagnostics controller 102 may use network information when sending configuration information to DN 108-112 for testing SUT 106 and/or diagnosing issues associated with SUT 106.

In some embodiments, diagnostics controller 102 may configure DNs 108 and 112 for testing SUT 106 in a live network. For example, SUT 106 may be configured to process and/or route traffic (e.g., voice, video, and/or application traffic) of a number of users in a live network. In this example, diagnostics controller 102 may configure DN 108 to simulate traffic in the live network. Continuing with this example, DNs 108 and 112 may be configured to observe the simulated traffic and/or the non-simulated traffic and generate traffic related metrics about the observed traffic.

In some embodiments, diagnostics controller 102 may analyze traffic related metrics and/or other information from DNs 108 and 112 to determine whether any SUT issues exist. If a SUT issue exists, diagnostics controller 102 may provide instructions and/or other information to DNs 108 and 112 for obtaining additional information from individual elements (e.g., nodes/functions 114-116) in SUT 106. For example, each of DNs 108 and 112 may perform polling of nodes/functions 114-116 using a diagnostics algorithm or related diagnostics scripts.

Referring to FIG. 3, in step 3001, test setup information (e.g., configuration information may be sent from diagnostics controller 102 to DN 108.

In step 3002, the test setup information may be forwarded from DN 108 to DN 112 and/or other DNs in computing environment 100 or SUT 106.

In step 3003, simulated or test traffic may be sent by DN 108 to DN 112 via SUT 106. For example, DN 108 may act as a traffic generator and send numerous types of packets that simulate one or more communications sessions.

In step 3004, after testing, test results may be sent from DN 108 to diagnostics controller 102. For example, DN 108 may collect traffic metrics from DN 112 and/or may generate test results based on these traffic metrics and/or other data from various sources.

In step 3005, diagnostics controller 102 may analyze test results and/or other information for determining whether one or more issues associated with SUT 106 exist. For example, diagnostics controller 102 may use test results and may consult data storage 104 for relevant network topology information and/or SUT configuration information.

In some embodiments, diagnostics controller 102 may determine that a potential issue associated with SUT 106 exists and may attempt to trigger diagnostics. For example, diagnostics controller 102 may send a diagnostics related message or related information to DN 108 and/or DN 112 for obtaining status information and/or other data from SUT 106 or node/function 114.

In step 3006, diagnostics related information may be sent from diagnostics controller 102 to DN 108 for obtaining status information from node/function 114.

In step 3007, the diagnostics related information may be forwarded from DN 108 to DN 112 and/or other DNs in computing environment 100 or SUT 106.

In step 3008, DN 112 may execute a diagnostics algorithm for obtaining status information and/or other information from node/function 114. In some embodiments, a diagnostics algorithm may include numerous scripts and/or logic for attempting to communicate with various network nodes, network functions, or related entities. For example, a diagnostics algorithm may attempt to request status information and/or other data from node/function 114 using a series or set of communications protocols.

In step 3009, a connection between DN 112 and node/function 114 may fail to be established. For example, outgoing communications from DN 112 to node/function 114 may be blocked or discarded by an intervening firewall located between DN 112 and node/function 114.

In step 3010, DN 108 may execute a diagnostics algorithm for obtaining status information and/or other information from node/function 114.

In step 3011, an SNMP related connection may be established between DN 108 and node/function 114.

In step 3012, an SNMP request message may be sent from DN 108 to node/function 114. For example, an SNMP request message may request status information and/or other information from a network management related database.

In step 3013, an SNMP answer message may be sent from node/function 114 to DN 108. For example, an SNMP answer message may provide status information and/or other information about node/function 114.

In step 3014, DN 108 may determine whether additional information is needed from node/function 114. If so, DN 108 or a related diagnostics algorithm may determine to use another communications protocol and/or a device specific script to obtain additional information.

In step 3015, a SSH related connection may be established between DN 108 and node/function 114.

In step 3016, one or more SSH commands may be sent from DN 108 to node/function 114 for obtaining various information about node/function 114. For example, during a SSH session, an SSH command may request various processing metrics associated with test traffic.

In step 3017, information may be sent from node/function 114 to DN 108 for indicating potential causes of one or more issues associated with SUT 106. For example, in response to an SSH command for status information, a router may indicate an issue caused by a routing table being full and being unable to flush entries.

In step 3018, a diagnostics report or related information may be sent to diagnostics controller 102. For example, diagnostics controller 102 may receive multiple diagnostics reports from one or more DNs 108-112 and may use these reports when generating a SUT diagnostics report. In this example, the SUT diagnostics report may indicate that SUT 106 experienced a throughput issue caused by port misconfiguration at node/function 114 and may indicate a potential solution where certain application traffic is sent to port numbers '3453' or '6785' instead of port number '8080' which also receives encrypted HTTP traffic. In another example, the SUT diagnostics report may indicate that SUT 106 experienced a bandwidth or congestion issue caused by link failures in a link aggregation group associated with node/function 116 and may indicate a potential solution where the links are inspected or replaced.

It will be appreciated that the communications and/or actions depicted in FIG. 3 are for illustrative purposes and that different and/or additional communications and/or actions than those depicted in FIG. 3 may be used for testing SUT 106 and/or for diagnosing issues associated with SUT 106. It will also be appreciated that various communications and/or actions described herein may occur concurrently or in a different order or sequence. For example, step 3008 may occur concurrently with step 3010.

Figure 4:
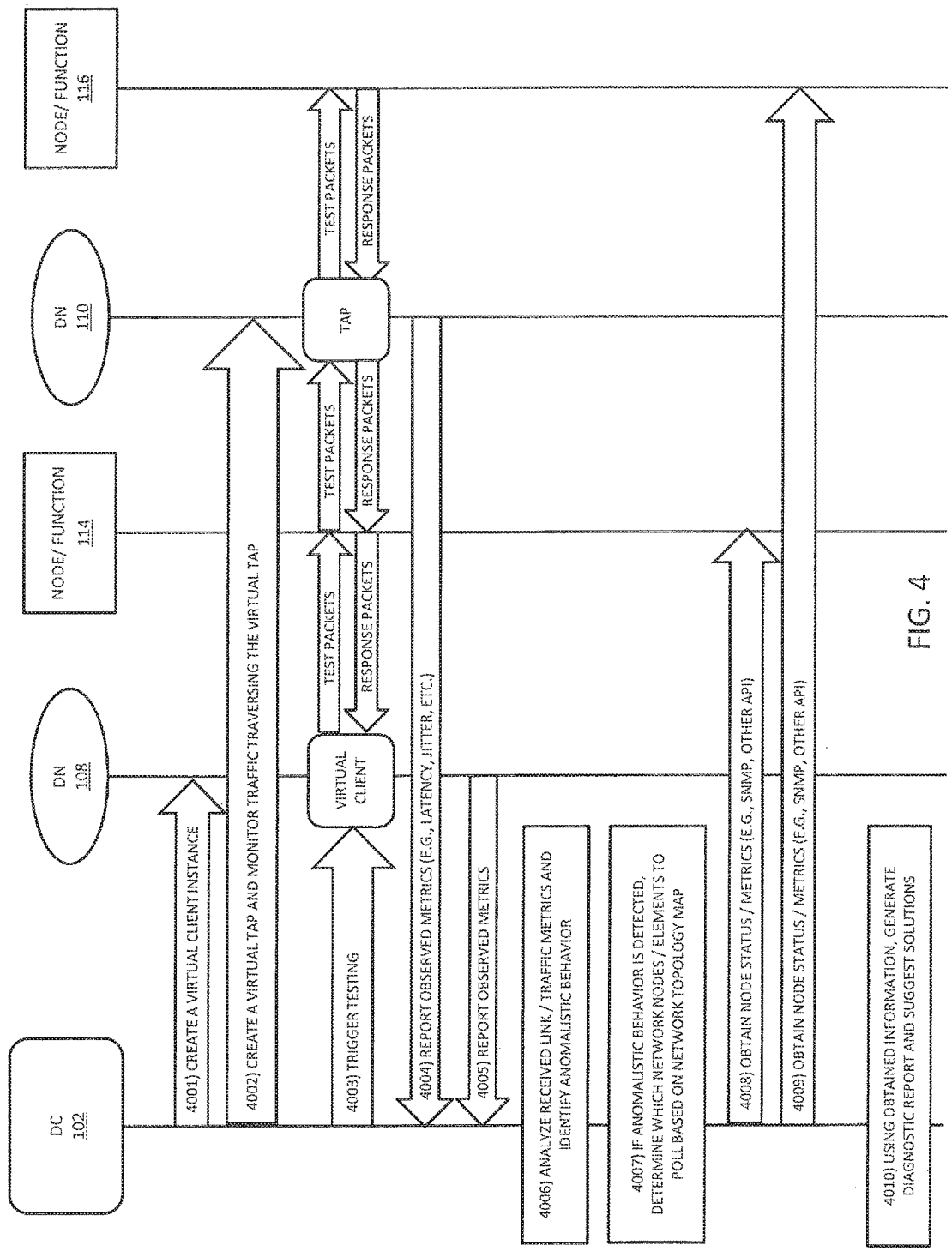
FIG. 4 is a diagram illustrating communications associated with network diagnostics according to another embodiment of the subject matter described herein.

FIG. 4 is a diagram illustrating communications associated with network diagnostics according to another embodiment of the subject matter described herein. In some embodiments, diagnostics controller 102 may interact with computing environment 100 for configuring, provisioning, or managing DNs 108-112 and/or testing SUT 106. For example, diagnostics controller 102 may use network information when sending configuration information to DN 108-112 for testing SUT 106 and/or diagnosing issues associated with SUT 106.

In some embodiments, diagnostics controller 102 may configure DNs 108-112 for testing SUT 106 in a live network. For example, SUT 106 may be configured to process and/or route traffic (e.g., voice, video, and/or application traffic) of a number of users in a live network. In this example, diagnostics controller 102 may configure DN 108 to simulate traffic in the live network. Continuing with this example, DNs 108-112 may be configured to observe the simulated traffic and/or the non-simulated traffic and generate traffic related metrics about the observed traffic.

In some embodiments, diagnostics controller 102 may receive traffic related metrics and/or other information from DNs 108-112 for analysis to determine whether any SUT issues exist. If a SUT issue exists, diagnostics controller 102 may provide instructions and/or other information to one or more DNs 108-112 for obtaining additional information from individual elements (e.g., nodes/functions 114-116) in SUT 106. For example, each of DNs 108-112 may perform polling of nodes/functions 114-116 using a diagnostics algorithm or related diagnostics scripts.

Referring to FIG. 4, in step 4001, diagnostics controller 102 may configure DN 108 as a virtual client instance. For example, a virtual client instance (e.g., software executing on a processor) may act as a traffic generator for generating and sending test traffic to SUT 106.

In step 4002, diagnostics controller 102 may configure DN 110 as a virtual tap. For example, a virtual tap (e.g., software executing on a processor) may act as a network tap and may monitor traffic that traverses DN 110.

In step 4003, diagnostics controller 102 may trigger DN 108 to start sending test traffic. For example, diagnostics controller 102 may send configuration information indicating test packets to send to SUT 106 or portions therein.

In some embodiments, after receiving a "start testing" trigger from diagnostics controller 102, test packets may be generated and sent from DN 108 to node/function 114 and processed. After processing, the test packets may be sent from node/function 114 to node/function 116 via DN 110. Continuing with this example, response packets may be generated and sent from node/function 116 to node/function 114 via DN 110 and then from node/function 114 to DN 108.

In some embodiments, DNs 108-110 or logic therein may monitor traffic data sent and/or generate traffic related metrics for diagnosing potential issues associated with SUT 106.

In step 4004, observed link and/or traffic metrics may be sent from DN 110 to diagnostics controller 102. For example, after testing is complete or at periodic intervals, test related information (e.g., latency, jitter, etc.) may be computed by DN 110 and reported to diagnostics controller 102.

In step 4005, observed link and/or traffic metrics may be sent from DN 108 to diagnostics controller 102. For example, after testing is complete or at periodic intervals, test related information (e.g., latency, jitter, etc.) may be computed by DN 108 and reported to diagnostics controller 102.

In step 4006, diagnostics controller 102 may analyze received link and/or traffic metrics to identify anomalistic behavior (e.g., one or more issues). For example, diagnostics controller 102 may determine that jitter associated with node/function 114 was significantly greater than expected or that node/function 116 did not appear to generate appropriate response packets.

In step 4007, if anomalistic behavior is detected, diagnostics controller 102 may determine which nodes/functions to poll or query for additional information. For example, diagnostics controller 102 may use logic, SUT information, and/or network information (e.g., topology information) to make its determinations.

In step 4008, diagnostics controller 102 may poll (e.g., request and/or poll) node/function 114 for status information, metrics, and/or other information that may be useful in diagnosing anomalistic behavior. For example, diagnostics controller 102 may use a script and/or a diagnostics algorithm that attempts to obtain status information from node/function 114 using multiple communications protocols and/or mechanisms (e.g., SNMP, an HTTP REST API, SHH commands, etc.)

In step 4009, diagnostics controller 102 may poll (e.g., request and/or poll) node/function 116 for status information, metrics, and/or other information that may be useful in diagnosing anomalistic behavior. For example, diagnostics controller 102 may use a script and/or a diagnostics algorithm that attempts to obtain status information from node/function 116 using multiple communications protocols and/or mechanisms (e.g., SNMP, an HTTP REST API, SHH commands, etc.)

In step 4010, diagnostics controller 102 may use obtained information (e.g., status information and monitored network behavior information) to generate a SUT diagnostics report including suggest solutions to identified issues.

It will be appreciated that the communications and/or actions depicted in FIG. 4 are for illustrative purposes and that different and/or additional communications and/or actions than those depicted in FIG. 4 may be used for testing SUT 106 and/or for diagnosing issues associated with SUT 106. It will also be appreciated that various communications and/or actions described herein may occur concurrently or in a different order or sequence.

Figure 5:
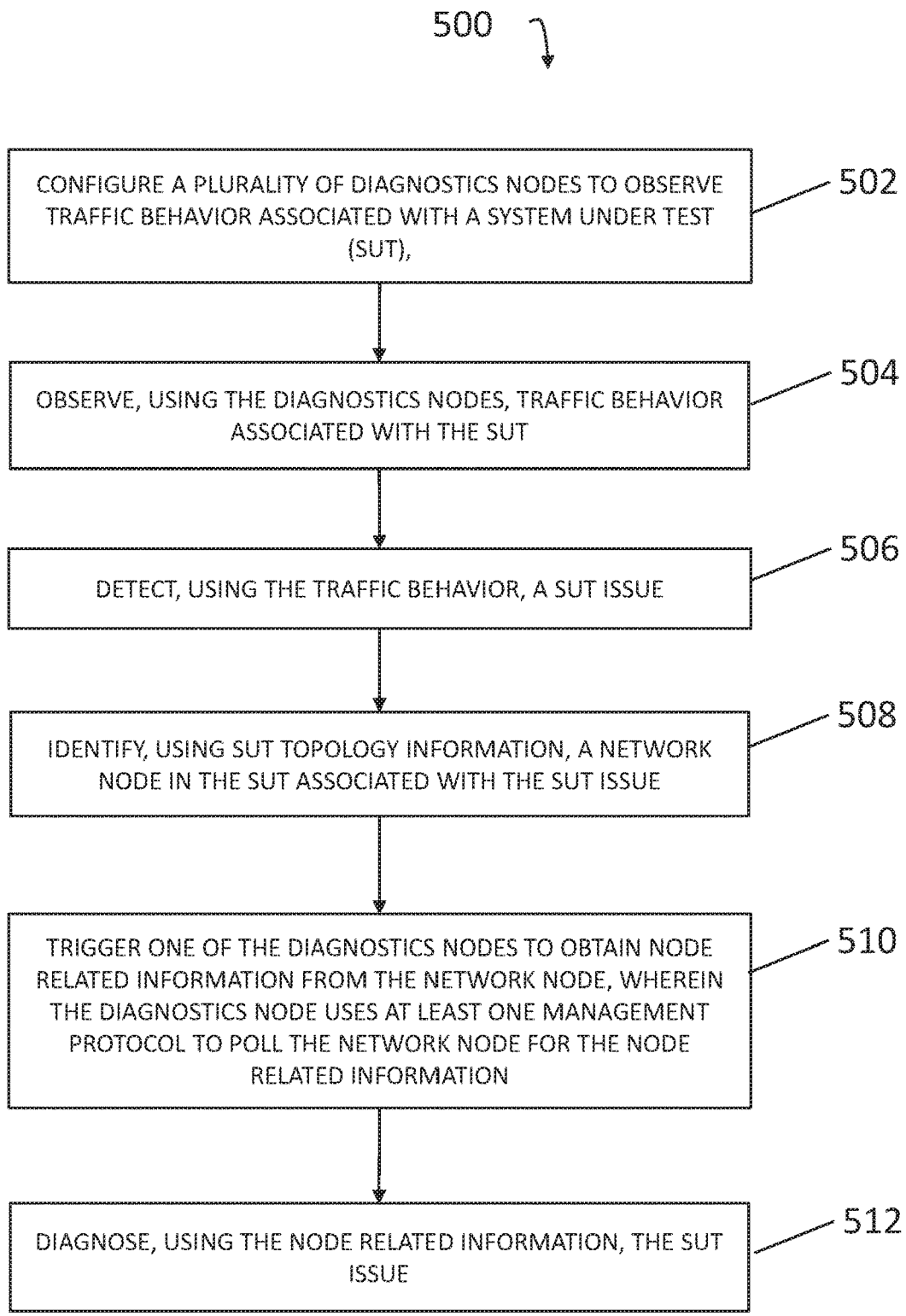
FIG. 5 is a diagram illustrating a process for network diagnostics according to an embodiment of the subject matter described herein.

FIG. 5 is a diagram illustrating a process 500 for network diagnostics according to an embodiment of the subject matter described herein. In some embodiments, process 500, or portions thereof, may be performed by or at diagnostics controller 102 and/or another node or module (e.g., a diagnostics controller). In some embodiments, process 500 may include steps 502, 504, and/or 506.

Referring to process 500, in step 502, a plurality of diagnostics nodes may be configured to observe traffic behavior associated with a SUT. For example, diagnostics controller 102 may send configuration information to DN 108 and DN 112 for testing SUT 106 and diagnosing any detected issues associated SUT 106.

In some embodiments, configuring a plurality of diagnostics nodes may include using network configuration information or SUT topology information.

In some embodiments, configuring a plurality of diagnostics nodes includes configuring a network tap for monitoring network traffic in the SUT.

In some embodiments, configuring a plurality of diagnostics nodes may include configuring one of the diagnostics nodes to send test traffic and configuring at least one of the diagnostics nodes to generate traffic metrics associated with the test traffic.

In step 504, traffic behavior associated with the SUT may be observed using the diagnostics nodes. For example, diagnostics node 108 may observe response messages from node/function 116 to traffic originated by it and diagnostics node 112 may observe request messages from node/function 114.

In step 506, a SUT issue may be detected using the traffic behavior. For example, using traffic metrics obtained from DN 108 and DN 112, diagnostics controller 102 may determine that 30% of traffic sent from DN 108 is not being responded.

In step 508, a network node in the SUT associated with the SUT issue may be identified using SUT topology information. For example, after determining that responses are not being received for traffic sent by DN 108, diagnostics controller 102 may determine that node/function 114 and node/function 116 may be associated with this SUT issue.

In some embodiments, a network node may include a load balancing node, an intrusion detection node, an intrusion protection node, an antivirus node, an antispam node, a firewall node, a switching node, or a routing node.

In step 510, one of the diagnostics nodes may be triggered to obtain node related information from the network node. The diagnostics node may use at least one management or communications protocol to poll the network node for the node related information. Some examples of node related information (e.g., device related information) may include configuration information, topology information, security information, supported communications protocols, memory type, memory usage, memory availability, manufacturer information, build date, processor type, processor usage, processor availability, operating system version, firmware version, node related metrics, throughput metrics, performance metrics, error metrics, status information, length of current status, storage capacity, storage usage, connectivity information (e.g., port information, link information, etc.), routing information, or buffer information.

In some embodiments, at least one management or communications protocol may include SNMP, SSH, Telnet, a CLI protocol, HTTP, and/or REST.

In some embodiments, polling a network node for node related information may include determining whether a first communications protocol is usable for communicating with the network node in the SUT and in response to determining that the first communications protocol is usable for communicating with the network node in the SUT, requesting, from the network node, the node related information using the first communications protocol.

In some embodiments, polling a network node for node related information may also include determining whether a second communications protocol is usable for communicating with the network node in the SUT and in response to determining that the second communications protocol is usable for communicating with the network node in the SUT, requesting, from the network node, the node related information using the second communications protocol.

In step 512, the SUT issue may be diagnosed using the node related information. For example, using SSH or an HTTP API, diagnostics controller 102 may retrieve performance metrics associated with node/function 114, e.g., a routing node. In this example, the performance metrics may indicate a significant drop in performance at two particular times during testing. In this example, diagnostics controller 102 may use this information along with information about what type of traffic was being sent at these times to determine that node/function 114 was misconfigured and, as such, failed to properly route session initiation protocol (SIP) traffic.

In some embodiments, diagnosing a SUT issue may include generating a diagnostics report indicating the SUT issue and at least one potential solution. For example, in response to determining that node/function 114 was misconfigured and failed to properly route session initiation protocol (SIP) traffic, diagnostics controller may indicate, in a diagnostics report, that a potential solution for the misconfiguration is to add routing entries to node/function 114 for routing SIP traffic.

It will be appreciated that process 500 is for illustrative purposes and that different and/or additional actions may be used. It will also be appreciated that various actions described herein may occur in a different order or sequence.

It should be noted that diagnostics controller 102 and/or functionality described herein may constitute a special purpose computing device. Further, diagnostics controller 102 and/or functionality described herein can improve the technological field of network diagnostics by providing mechanisms for automatically testing SUT 106 and diagnosing issues associated with SUT 106. Further, diagnostics controller 102 and/or functionality described herein can improve the technological field of network diagnostics by providing mechanisms for obtaining status information and/or other information from nodes/functions 114-116 in SUT 106 using a diagnostics algorithm that attempts to communicate using one or more communications protocols.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for network diagnostics, the method comprising: at a diagnostics controller implemented using at least one processor:

configuring a plurality of diagnostics nodes to observe traffic behavior associated with a system under test (SUT), wherein the SUT includes one or more network nodes for processing live network traffic, wherein at least one of the plurality of diagnostics nodes generates test traffic, wherein configuring the plurality of diagnostics nodes includes after detecting a network condition, dynamically inserting a virtual network tap in the SUT for monitoring the live network traffic and the test traffic in the SUT, wherein the virtual network tap copies at least some of the live network traffic or test traffic and provides the copied traffic to another diagnostics node or the diagnostics controller;

observing, using the diagnostics nodes, traffic behavior associated with the SUT;

detecting, using the traffic behavior, a SUT issue, wherein detecting the SUT issue includes using the copied traffic to detect changes in the traffic behavior;

identifying, using SUT topology information, a network node in the SUT associated with the SUT issue;

triggering one of the diagnostics nodes to obtain node related information from the network node, wherein the diagnostics node uses at least one communications protocol to poll the network node for the node related information; and diagnosing, using the node related information, the SUT issue.

2. The method of claim 1 wherein configuring the plurality of diagnostics nodes includes configuring one of the diagnostics nodes to send the test traffic and configuring at least one of the diagnostics nodes to generate traffic metrics associated with the test traffic.

3. The method of claim 1 wherein the at least one communications protocol includes a simple network management protocol (SNMP), a secure shell (SSH) protocol, a Telnet protocol, a command line interface (CLI) interface, a hypertext transfer protocol (HTTP), or a representational state transfer (REST) protocol.

4. The method of claim 1 wherein polling the network node for the node related information:

determining whether a first communications protocol is usable for communicating with the network node in the SUT; and in response to determining that the first communications protocol is usable for communicating with the network node in the SUT, requesting, from the network node, the node related information using the first communications protocol.

5. The method of claim 4 comprising:

determining whether a second communications protocol is usable for communicating with the network node in the SUT; and in response to determining that the second communications protocol is usable for communicating with the network node in the SUT, requesting, from the network node, the node related information using the second communications protocol.

6. The method of claim 1 wherein configuring the plurality of diagnostics nodes includes using network configuration information or the SUT topology information.

7. The method of claim 1 wherein diagnosing the SUT issue includes generating a diagnostics report indicating the SUT issue and at least one potential solution.

8. The method of claim 1 wherein the network node includes a load balancing node, an intrusion detection node, an intrusion protection node, an antivirus node, an antispam node, a firewall node, a switching node, or a routing node.

9. A system for network diagnostics, the system comprising:

at least one processor; and a diagnostics controller implemented using the at least one processor, wherein the diagnostics controller is configured to configure a plurality of diagnostics nodes to observe traffic behavior associated with a system under test (SUT), wherein the SUT includes one or more network nodes for processing live network traffic, wherein at least one of the plurality of diagnostics nodes generates test traffic, wherein configuring the plurality of diagnostics nodes includes after detecting a network condition, dynamically inserting a virtual network tap in the SUT for monitoring the live network traffic and the test traffic in the SUT, wherein the virtual network tap copies at least some of the live network traffic or test traffic and provides the copied traffic to another diagnostics node or the diagnostics controller, to observe, using the diagnostics nodes, traffic behavior associated with the SUT, to detect, using the traffic behavior, a SUT issue, wherein detecting the SUT issue includes using the copied traffic to detect changes in the traffic behavior, to identify, using SUT topology information, a network node in the SUT associated with the SUT issue, to trigger one of the diagnostics nodes to obtain node related information from the network node, wherein the diagnostics node uses at least one communications protocol to poll the network node for the node related information, and to diagnose, using the node related information, the SUT issue.

10. The system of claim 9 wherein the diagnostics controller is configured to configure one of the diagnostics nodes to send the test traffic and to configure at least one of the plurality of diagnostics nodes to generate traffic metrics associated with the test traffic.

11. The system of claim 9 wherein the at least one communications protocol includes a simple network management protocol (SNMP), a secure shell (SSH) protocol, a Telnet protocol, a command line interface (CLI) interface, a hypertext transfer protocol (HTTP), or a representational state transfer (REST) protocol.

12. The system of claim 9 wherein the diagnostics controller is configured to determine whether a first communications protocol is usable for communicating with the network node in the SUT and in response to determining that the first communications protocol is usable for communicating with the network node in the SUT, to request, from the network node, the node related information using the first communications protocol.

13. The system of claim 12 wherein the diagnostics controller is configured to determine whether a second communications protocol is usable for communicating with the network node in the SUT and in response to determining that the second communications protocol is usable for communicating with the network node in the SUT, to request, from the network node, the node related information using the second communications protocol.

14. The system of claim 9 wherein configuring the plurality of diagnostics nodes includes using network configuration information or the SUT topology information.

15. The system of claim 9 wherein the diagnostics controller is configured to generate a diagnostics report indicating the SUT issue and at least one potential solution.

16. The system of claim 9 wherein the network node includes a load balancing node, an intrusion detection node, an intrusion protection node, an antivirus node, an antispam node, a firewall node, a switching node, or a routing node.

17. A non-transitory computer readable medium having stored thereon executable instructions embodied in the computer readable medium that when executed by at least one processor of a diagnostics controller cause the diagnostics controller to perform steps comprising:

configuring a plurality of diagnostics nodes to observe traffic behavior associated with a system under test (SUT), wherein the SUT includes one or more network nodes for processing live network traffic, wherein at least one of the plurality of diagnostics nodes generates test traffic, wherein configuring the plurality of diagnostics nodes includes after detecting a network condition, dynamically inserting a virtual network tap in the SUT for monitoring the live network traffic and the test traffic in the SUT, wherein the virtual network tap copies at least some of the live network traffic or test traffic and provides the copied traffic to another diagnostics node or the diagnostics controller;

observing, using the diagnostics nodes, traffic behavior associated with the SUT;

detecting, using the traffic behavior, a SUT issue, wherein detecting the SUT issue includes using the copied traffic to detect changes in the traffic behavior;

identifying, using SUT topology information, a network node in the SUT associated with the SUT issue;

triggering one of the diagnostics nodes to obtain node related information from the network node, wherein the diagnostics node uses at least one communications protocol to poll the network node for the node related information; and diagnosing, using the node related information, the SUT issue.

18. The non-transitory computer readable medium of claim 17 wherein configuring the plurality of diagnostics nodes includes configuring at least one of the diagnostics nodes to send the test traffic and configuring at least one of the diagnostics nodes to generate traffic metrics associated with the test traffic.

* * * * *